Aug. 18, 1970   T. R. JONES, JR   3,524,221
APPARATUS FOR MONITORING POLYMER VISCOSITY IN A SPINNING UNIT
Filed Sept. 13, 1967
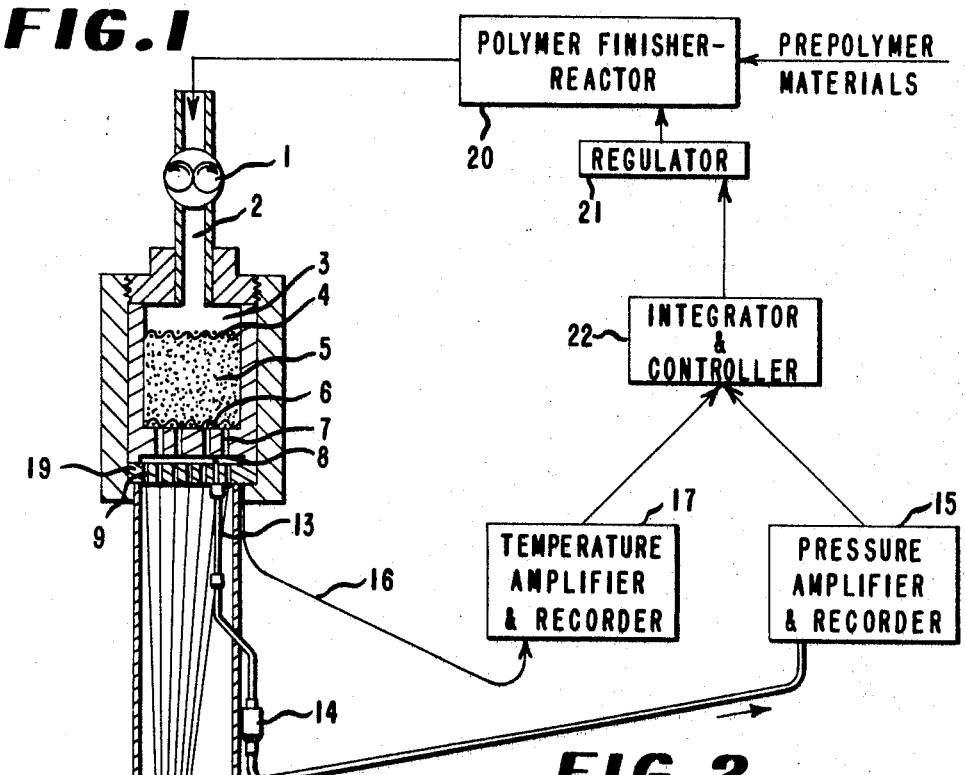
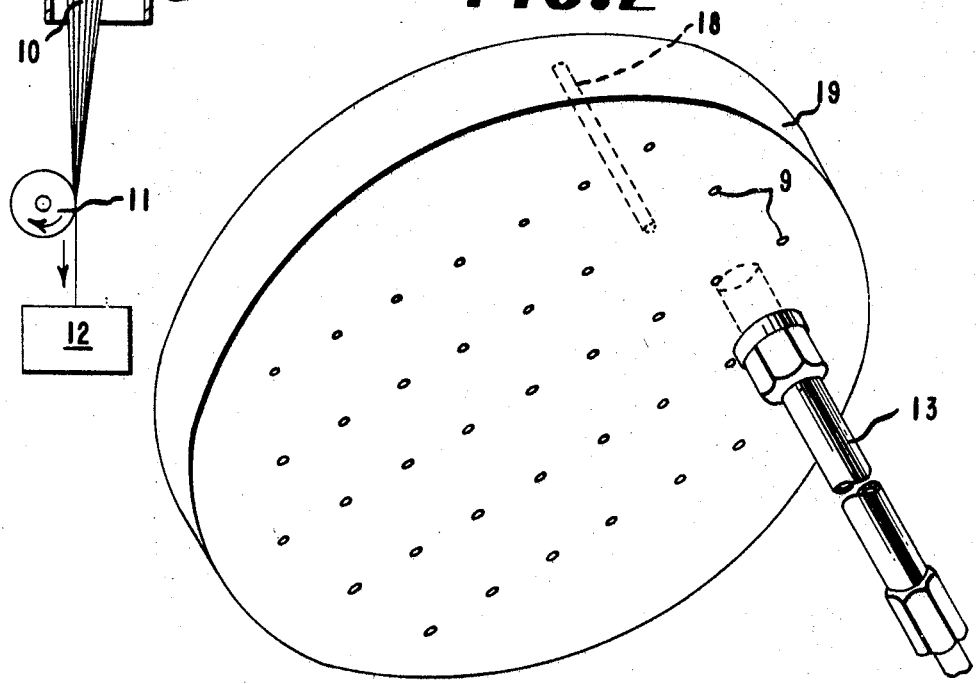
INVENTOR
THURMAN R. JONES, JR.
BY  *E. Leigh Hunt*
ATTORNEY

United States Patent Office 3,524,221
Patented Aug. 18, 1970

---

3,524,221
APPARATUS FOR MONITORING POLYMER VISCOSITY IN A SPINNING UNIT
Thurman Ralston Jones, Jr., Greenville, N.C., assignor to E. I. du Pont de Nemours and Company, Wilmington, Del., a corporation of Delaware
Filed Sept. 13, 1967, Ser. No. 667,415
Int. Cl. D01d 3/100
U.S. Cl. 18—8                                                3 Claims

---

ABSTRACT OF THE DISCLOSURE

In a process for the production of synthetic filaments which comprises polymerizing prepolymer material in a reactor to form molten thermoplastic polymer, filtering the polymer by forcing the polymer under high pressure at a constant flow rate through a filter medium, extruding the filtered polymer through a spinneret having capillaries, and then quenching the extruded polymer at atmospheric pressure to form the filaments, the improvement in controlling filament uniformity comprising measuring the melt-viscosity of the polymer being extruded by measuring the pressure and temperature of the polymer after filtering and just prior to extrusion through the spinneret capillaries, comparing the viscosity with the viscosity desired, and then making the appropriate change in the reactor conditions to change the viscosity toward the desired viscosity. Also an apparatus for carrying out the process which comprises a pressure sensor located between the filter medium and spinneret.

BACKGROUND OF THE INVENTION

Field of the invention

This invention is concerned with the manufacture of synthetic fibers and, more particularly, with monitoring the melt viscosity of a thermoplastic polymer as it is melt-spun into a synthetic yarn. Viscosity changes in the polymer can be used to calculate and make appropriate corrections in the polymer finisher conditions. Though the polymer may be within pre-determined acceptable limits for commercial production corrections in the conditions can be made once a trend in viscosity is evident, thus bringing this property back toward midrange and avoiding off-specification production.

Description of the prior art

The preparation of synthetic fibers from thermoplastic polymers such as polyesters and polyamides is well known. The desirability of a high degree of uniformity in synthetic yarns is well recognized and, for this reason, great efforts to obtain uniformity are made in commercial manufacturing processes. Fundamental to the uniformity of synthetic yarns is, of course, the uniformity of the polymer supplied to the melt-spinning step with uniformity of polymer molecular weight being of paramount importance. Many methods of measuring polymer molecular weight are known and used to monitor and control the reactor or finisher conditions utilized in polymer preparation and the spinning conditions. Examples of such methods include the measurement of melt viscosity via polymer displacement in a polymer finishing apparatus, as described by Forney et al. in U.S. Pat. 3,036,214, dated May 22, 1962, and the measurement of solution viscosity of the yarn itself, dissolved in a suitable solvent as described by Allen in Techniques of Polymer Characterization, chapter 6, Butterworth's Scientific Publications, London, 1959. Numerous devices have been described for measurement of polymer melt viscosity, e.g. British 755,613, published Aug. 22, 1956, and U.S. Pat. 3,048,030, dated Aug. 7, 1962. However, the art has apparently failed to recognize the importance of monitoring the viscosity of a polymer under exactly the same conditions to which it is exposed during extrusion to yarn or if the art did recognize the importance, a suitable apparatus was not developed. The present invention overcomes this deficiency.

SUMMARY OF THE INVENTION

The present invention provides an apparatus for monitoring the melt viscosity of a thermoplastic polymer as it is melt-spun into yarn. The method of monitoring requires no extrapolation to a different temperature, time, pressure, or sheer-stress for an interpretation of the actual conditions of extrusion but gives an instantaneous and direct reading of these conditions as they actually exist.

In accordance with the invention, there is provided an apparatus for melt-spinning a thermoplastic polymer into yarn wherein a stream of flowing, molten polymer is supplied to a positive displacement pump which forces the polymer at a uniform rate through a filtering medium and then through a multi-hole spinneret to form a plurality of extruded filaments which are subsequently solidified by cooling, characterized by the continuous measuring and recording of the pressure of the molten polymer immediately above the spinneret, and of the temperature of the spinneret.

In a preferred embodiment of the invention, molten polymer is forced at a uniform rate by means of a metering gear pump through a sand pack and then through a metal spinneret which is drilled to accommodate a thermocouple for measuring temperature and which is fitted with a pressure transducer for measuring the pressure of the molten polymer immediately above the spinneret. The thermocouple and transducer are connected to suitable amplifying and recording means.

It is well known that melt viscosity is related to the ratio of sheer stress to sheer rate. In the present invention polymer is metered through the spinneret at a constant flow rate, which provides a constant sheer rate through the spinneret capillaries as the total cross-sectional area of the capillaries is constant. At constant sheer rate and constant temperature, melt viscosity then becomes directly related to sheer stress, which, in turn, is directly related to the pressure drop through the spinneret capillaries. As the pressure below the spinneret within the quenching chamber is atmospheric and constant, measurement of the pressure above the spinneret provides a direct indication of the melt viscosity.

Because melt viscosity is temperature dependent, it is necessary to continuously measure and record the temperature of the spinneret and apply a suitable correction factor for temperature fluctuations, as needed.

In addition, utilizing the numerous small capillaries of the spinneret as the viscometer leads to extremely high accuracy and sensitivity with regard to viscosity determination in view of the viscous nature of the molten thermoplastic polymer.

BRIEF DESCRIPTION OF THE DRAWINGS

In order that the invention may be more readily understood, reference is now made by way of example to the accompanying drawings in which:

FIG. 1 is a schematic representation of a melt-spinning apparatus fitted with pressure transducer, thermocouple, recording means, and regulator means for correcting the conditions within the polymer finisher for bringing the viscosity back toward midrange. For a more complete description of a polymer finisher viscosity regulator system useful in practicing this invention refer to pending U.S. patent application Ser. No. 622,255 filed Mar. 10, 1967, by Kilpatrick and Willey.

FIG. 2 is a schematic illustration in perspective of a multi-hole spinneret plate showing a pressure transducer in place and a channel suitable for insertion of a thermocouple.

DESCRIPTION OF THE PREFERRED EMBODIMENT

Referring now to FIG. 1, molten polymer from a source not shown is supplied to metering gear pump 1 which forces the polymer at a constant rate through conduit 2 into the sand cavity 3 of a melt-spinning head. The polymer traverses the top screen 4, sand filter 5, bottom screen 6 and then moves through channels 7 in the bottom of the sand holder to the space 8 immediately above the spinneret. The polymer is then forced through the spinneret capilaries 9 to form extruded filaments 10 which are quenched, passed over rotating roller 11 and then wound up in package 12.

The pressure of the polymer in space 8 is measured by means of pressure transducer 13, converter into an electrical signal in bulb 14 and indicated and recorded by recorder 15. The temperature of the spinneret is measured by thermocouple 16, with the temperature being indicated and recorded on recorder 17. In normal operation the temperature of the unit is maintained at the desired level by electrical or fluid heating means with the assistance of suitable insulation.

The polymer finisher 20 is illustrated as having an associated viscosity regulator 21 which, in the case of condensation polymers, regulates the vacuum with the finisher, thereby effectively controlling polymer viscosity. Integrater and controller 22 determines the actual viscosity as based on the temperature and pressure above the spinneret, compares this with the desired viscosity, and transmits the appropriate signal to regulator 21.

FIG. 2 shows schematically a spinneret plate 19 with a pressure transducer 13 fitted into the face of the spinneret and extending through the spinneret so that the pressure-sensing diaphragm is exposed at the top of the spinneret. Channel 18 is drilled into the body of the spinneret to provide a place for inserting a thermocouple for accurate measurement of the spinneret temperature.

The pressure of the molten polymer above the spinneret may be measured with any suitable device of sufficient sensitivity which is stable at the temperature of operation. A suitable device is the Dynisco melt pressure transducer Model PT-422, available from the Dynisco Division of American Brake Shoe, 40 Ames St., Cambridge, Mass. This device uses a bonded strain gauge measuring element for converting pressure indications to electrical signals.

Amplifying and recording devices suitable for use in the present invention are well known in the art, and a wide choice of suitable instruments is available commercially.

A constant rate of flow of polymer through the spinning apparatus may be maintained by any suitable positive displacement pump. Metering gear pumps are preferred. Such pumps are described, for example, by Graves in U.S. Pat 2,278,875, issued Apr. 7, 1942, and by Heckert in U.S. Pat. 2,424,750, issued July 29, 1947. Gear pumps are available commercially from the Zenith Product Company, West Newton, Mass.

Once the pressure above the spinneret and temperature of the polymer are known the melt viscosity may be calculated or taken from a previously prepared table based on the constant flow rate and cross-sectional area of the capilaries in the spinneret. The mathematical relationships are amplified by McCabe and Smith in Unit Operations of Chemical Engineering (1956), chapter 2. As before disclosed the invention lends itself readily to automatic regulation of the polymer viscosity by controlling the reaction conditions within the polymer finisher.

Suitable melt-spinning units utilizing a filtering medium above the spinneret are shown by Graves in U.S. Pat. 2,266,363, dated Dec. 16, 1941, by Hull et al. in U.S. Pat. 2,266,368, dated Dec. 16, 1941, by McCormick in U.S. Pat. 3,028,627, dated Apr. 10, 1962, and by Tait in U.S. Pat. 3,050,774, dated Aug. 28, 1962. Other types of melt spinning apparatus may be used when modified in accordance with the principles of the present invention to provide for measurement of the temperature of the spinneret and the pressure of the molten polymer immediately above the spinneret.

EXAMPLE

One spinneret of a multispinneret spinning machine is fitted with a pressure transducer and thermocouple in a manner similar to that shown in FIG. 1. The pressure transducer has a range of 0 to 1500 pounds per square inch (p.s.i.) (0–102 atm.) and is connected to a recording system which records pressure on a 6-inch-wide (15 cm.-wide) strip chart having 100 subdivisions and adjusted to record pressures from 0 to 1000 p.s.i. (0–68 atm.). Chart speed is 12 inches per hour. The spinneret has 56 holes with each hole being 0.015 inch (0.38 mm.) in diameter and 0.030 inch (0.76 mm.) in length.

Molten polyethylene terephthalate having a relative viscosity of 25 to 26 (as defined in U.S. Pat. 3,216,187) is metered through the sand pack and spinneret at the rate of 11.02 lbs./hr. The thermocouple records a spinneret temperature of 281.3° C., which remains constant during the experiment. The initial pressure drop across the spinneret is 680 p.s.i. (46 atm.) which corresponds to a melt viscosity of 1376 poises. Over a period of twelve hours several minor pressure deviations of less than 5 minutes duration are noted which are recorded on the chart as changes of 0.5 to 1 chart subdivision in magnitude. This corresponds to melt viscosity deviations of 10 to 20 poises. In addition, one large deviation in pressure of 46 p.s.i. (3.1 atm.) is noted, which corresponds to a viscosity deviation of 94 poises.

The 56 filaments are quenched, drawn, and wound into 4 packages of 70 denier-14 filament yarn of commercial quality.

Adjustments may be made upstream of the spinneret in the polymer finisher conditions to correct the viscosity of the polymer whenever the viscosity is varying at the spinneret. Also, if the viscosity is outside of previously determined acceptable limits the product may be segregated to avoid nonuniform production until the viscosity is brought back into acceptable limits. It will be readily recognized that the above-described invention, which provides a sensitive and direct method of measuring fluctuations in polymer viscosity at the critical point of extrusion through spinneret capillaries under actual spinning conditions, is a valuable contribution to the art of fiber manufacture.

What is claimed is:

1. In apparatus for monitoring the melt viscosity of a polymer being melt spun into synthetic filaments which comprises a spinneret having capillaries for extruding molten thermoplastic polymer; a quenching chamber for solidifying the extruded polymer at atmospheric pressure positioned below the spinneret; a filtering medium located above and spaced from the spinneret; and a positive displacement pump to force molten polymer under high pressure at substantially a constant flow rate through the filtering medium and spinneret, the filtering medium and spinneret being contained in a housing having entry and exit openings to which the pump and the quenching chamber respectively are operatively connected; the improvement of a pressure sensor positioned immediately above the spinneret, the spinneret being further characterized as operatively connected to a thermocouple for measuring temperature.

2. Apparatus as in claim 1 wherein the sensor is a pressure transducer having a pressure-sensing diaphragm, the diaphragm being located within the annular space between the filter medium and the spinneret.

3. Apparatus as in claim 2 wherein the sensor is mounted in the spinneret with a pressure-tight seal by passing from the quenching chamber through the spinneret.

References Cited

UNITED STATES PATENTS

| | | |
|---|---|---|
| 3,032,822 | 5/1962 | Maddock. |
| 3,110,547 | 11/1963 | Emmert. |
| 3,148,231 | 9/1964 | Spencer _____ 264—4 |
| 3,354,501 | 11/1967 | Bachman et al. _____ 18—2 |
| 3,354,504 | 11/1967 | Lehner _____ 18—8 |

FOREIGN PATENTS 565,282  11/1944  Great Britain.

WILBUR L. McBAY, Primary Examiner

U.S. Cl. X.R.

18—2; 264—40, 177